(12) United States Patent
Hoogendoorn et al.

(10) Patent No.: US 10,472,808 B2
(45) Date of Patent: Nov. 12, 2019

(54) WATER MIXER WITH LEVER HANDLE

(71) Applicant: Phoenix Industries Pty Ltd., Bayswater (AU)

(72) Inventors: John Henri Hoogendoorn, Bayswater (AU); Ban Hsi Liu, Bayswater (AU); Andrew John Cocks, Bayswater (AU)

(73) Assignee: Phoenix Industries Pty Ltd., Bayswater (AU)

( * ) Notice: Subject to any disclaimer, the term of this patent is extended or adjusted under 35 U.S.C. 154(b) by 205 days.

(21) Appl. No.: 15/032,374

(22) PCT Filed: Oct. 28, 2014

(86) PCT No.: PCT/AU2014/050313
§ 371 (c)(1),
(2) Date: Apr. 27, 2016

(87) PCT Pub. No.: WO2015/061846
PCT Pub. Date: May 7, 2015

(65) Prior Publication Data
US 2016/0265201 A1    Sep. 15, 2016

(30) Foreign Application Priority Data
Oct. 28, 2013   (AU) .................................. 2013904154

(51) Int. Cl.
*E03C 1/04*   (2006.01)
*F16K 31/60*   (2006.01)
(Continued)

(52) U.S. Cl.
CPC ............ *E03C 1/0412* (2013.01); *F16K 11/06* (2013.01); *F16K 11/0787* (2013.01);
(Continued)

(58) Field of Classification Search
CPC .. E03C 1/0412; E03C 2001/026; F16K 11/06; F16K 27/04; F16K 31/605;
(Continued)

(56) References Cited

U.S. PATENT DOCUMENTS

| 4,274,442 A | 6/1981 | Bernat et al. |
| D534,619 S | 1/2007 | Garner |

(Continued)

FOREIGN PATENT DOCUMENTS

| AU | 304155 S | 11/2005 |
| CN | 101418866 A | 4/2009 |

(Continued)

OTHER PUBLICATIONS

English Abstract of DE 27338461.
(Continued)

*Primary Examiner* — Marina A Tietjen
*Assistant Examiner* — Frederick D Soski
(74) *Attorney, Agent, or Firm* — Woodard, Emhardt, Henry, Reeves & Wagner, LLP

(57) ABSTRACT

A water mixer with mixer cartridge (40) with control element (42) and lever handle (31) operable from left to right to control the ratio water flow from respective hot and cold intakes to a single outlet (18), and about a transverse axis to control rate of flow. A mixer body (20) defines a post (22) and a protruding outlet arm (24) at its end. The body defines, at the aforesaid end of the post and extending into the arm, a rim (25) about a recess (26) that receives part of the lever handle in a central off position thereof. In another aspect, lever handle (31) is pivotally mounted to support (50, 150) at a first pivot (52,54) that is fixed against translation and to the control element of the cartridge at a second pivot (48) that is slidable in a slot (39).

10 Claims, 7 Drawing Sheets

(51) Int. Cl.
*F16K 11/06* (2006.01)
*F16K 27/04* (2006.01)
*F16K 11/078* (2006.01)
*E03C 1/02* (2006.01)

(52) U.S. Cl.
CPC ............ *F16K 27/04* (2013.01); *F16K 31/605* (2013.01); *E03C 2001/026* (2013.01); *Y10T 137/9464* (2015.04)

(58) Field of Classification Search
CPC ........... F16K 11/0787; Y10T 137/9464; Y10T 137/86815; Y10T 137/86823
See application file for complete search history.

(56) References Cited

U.S. PATENT DOCUMENTS

| | | | |
|---|---|---|---|
| D543,415 S | 5/2007 | Duranti | |
| 7,753,074 B2 | 7/2010 | Rosko et al. | |
| 2003/0102256 A1* | 6/2003 | Takagi | B01D 35/04 210/101 |
| 2008/0023085 A1 | 1/2008 | Rosko et al. | |
| 2009/0025808 A1* | 1/2009 | Kacik | F16K 11/0787 137/625 |
| 2009/0090414 A1* | 4/2009 | Di Nunzio | F16K 11/078 137/1 |
| 2010/0155505 A1* | 6/2010 | Lopp | E03C 1/0404 239/428.5 |
| 2010/0326553 A1* | 12/2010 | Kacik | E03C 1/04 137/801 |
| 2012/0006434 A1 | 1/2012 | Leinen | |
| 2013/0087211 A1 | 4/2013 | Di Nunzio | |

FOREIGN PATENT DOCUMENTS

| | | |
|---|---|---|
| DE | 2738461 | 3/1979 |
| DE | 2757525 | 7/1979 |
| DE | 3510351 | 7/1986 |
| DE | 4443123 A1 | 6/1996 |
| GB | 2429760 | 3/2007 |

OTHER PUBLICATIONS

English Abstract of DE 2757525.
English Abstract of DE 3510351.
International Search Report, PCT/AU2014/050313, dated Nov. 11, 2014.
PCT Written Opinion, Application No. PCT/AU2014/050313, dated Nov. 11, 2014.
English Machine Translation of DE4443123A1, retrieved from www.worldwide.totalpatentone.com on Dec. 18, 2018.
Chinese Search Report App. No. 2018104476621 dated Mar. 13, 2019.
English Translation of CN101418866A dated Apr. 29, 2009.

* cited by examiner

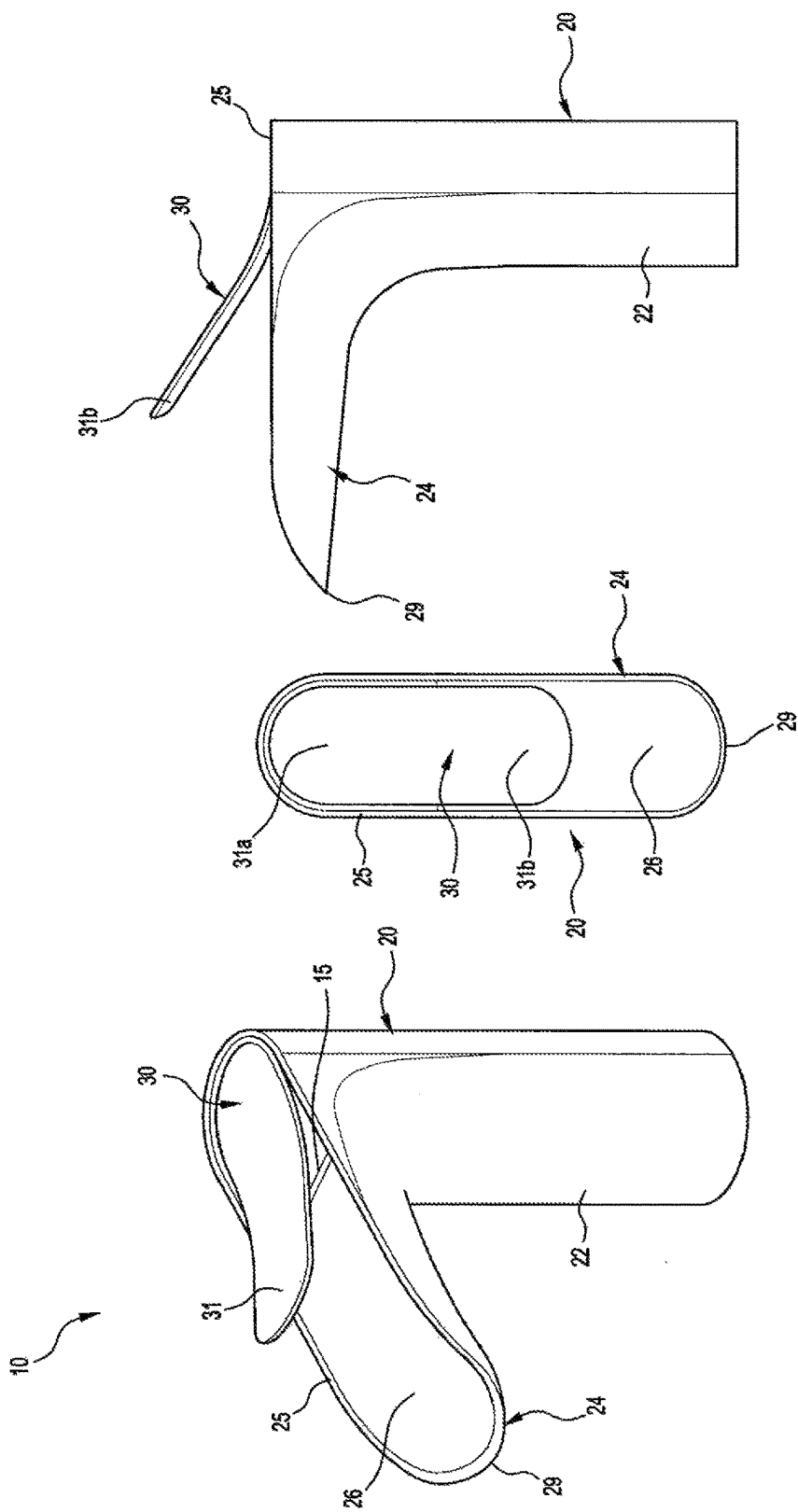

WATER MIXER WITH LEVER HANDLE

FIELD OF THE INVENTION

This invention relates generally to water mixers, in particular those of a kind in which there is a lever handle mounted for rotation to left and right from a central position to control water temperature, and vertically to control rate of flow. In one common application of particular interest such mixers are referred to as basin mixers.

BACKGROUND OF THE INVENTION

Basin mixers of the aforementioned kind typically have a mixer cartridge within a central post with a control element operated by the lever handle. The arm or spout of the mixer protrudes from the top of the post and the usual arrangement has the lever handle sitting proud of the top of the post and arm to allow the front of the lever handle to clear the edge of the post in the fully on position, in which the lever handle is most commonly inclined at 22° to horizontal. Thus, the usual mixer design has a lever handle assembly sitting on top of the mixer body. This necessary structural configuration has proven a limitation on the range of designs that can be offered by manufacturers.

It is an object of the present invention to provide alternative options in the layout of water mixers that facilitate designs not hitherto feasible.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

The present invention addresses the limitation discussed above in one aspect by reconfiguring the arrangement between the mixer body and the lever handle and, in another aspect, by re-arranging the operative relationship between the lever handle and the control element of the mixer cartridge.

In a first aspect, the invention provides a water mixer comprising a mixer cartridge having a control element operable to control water flow from respective hot and cold water intakes to a single water outlet so as to vary the proportions of hot and cold water at the outlet, and a lever handle operably coupled to the control element of the mixer cartridge, which lever handle is mounted for rotation to left and right from a central position to control water temperature and about a transverse axis to control rate of flow, wherein the water mixer further includes a mixer body that defines a post and, at an end of the post, a protruding arm that includes said water outlet, and the body further defines, at said end of the post and extending into the arm, a rim about a recess that receives part of the lever handle in a central off position thereof.

In a second aspect, the invention provides a water mixer including a mixer cartridge having a control element operable to control water flow from respective hot and cold water intakes to a single water outlet so as to vary the proportions of hot and cold water at the outlet, and a lever handle operably coupled to the control element of the mixer cartridge, which lever handle is mounted for rotation to left and right from a central position to control water temperature and about a transverse axis to control rate of flow, wherein the lever handle is pivotally mounted to a support for the lever handle at a first pivot that is fixed against translation and to the control element of the mixer cartridge at a second pivot that is slidable in a slot with respect to the lever handle and/or the control element.

A particularly preferred embodiment of the invention includes the features of both aspects.

The lever handle preferably includes a boss structure and a blade that lies atop and projects from the boss structure, and at least partially curves upwardly with respect to the mixer body to form a finger graspable part of the handle.

In a preferred arrangement of the second aspect of the invention, the slidable pivot is slidable in a slot in the lever handle. In this arrangement it may be provided by laterally protruding pins on the control element, for example on a cap of the control element.

In a preferred arrangement, the fixed first pivot defines an axis of handle rotation that is parallel to an axis of rotation of the control element on the mixer cartridge, and both axes intersect a central axis of the post of the mixer body.

The aforesaid rim of the mixer body may include parallel sides and a curved portion on the side of the post opposite the protruding arm, the dimensions of the rim and lever handle being such that the recess defined by the rim snugly bounds the blade of the lever handle at the boss member.

In a preferred arrangement, the support for the lever including the boss member is provided by an annular support member that accommodates said rotation to left and right and vertically. Preferably, there is provided a cam mechanism by which the lever handle is progressively raised as it is rotated to left or right whereby the handle blade clears the aforesaid rim of the mixer body. This cam mechanism may comprise, for example, a cam lobe projecting from the handle co-operable with a rising cam surface as the lever handle is rotated.

As used herein, except where the context requires otherwise, the term "comprise" and variations of the term, such as "comprising", "comprises" and "comprised", are not intended to exclude further additives, components, integers or steps.

BRIEF DESCRIPTION OF THE DRAWINGS

The invention will now be further described, by way of example only, with reference to the accompanying drawings in which:

FIG. 1 is an isometric view of a basin mixer according to one embodiment of the invention, with the lever handle in the central off position;

FIGS. 2 and 3 are respective plan and side elevations of the basin mixer depicted in FIG. 1;

DETAILED DESCRIPTION OF THE EMBODIMENTS

Figure 4:
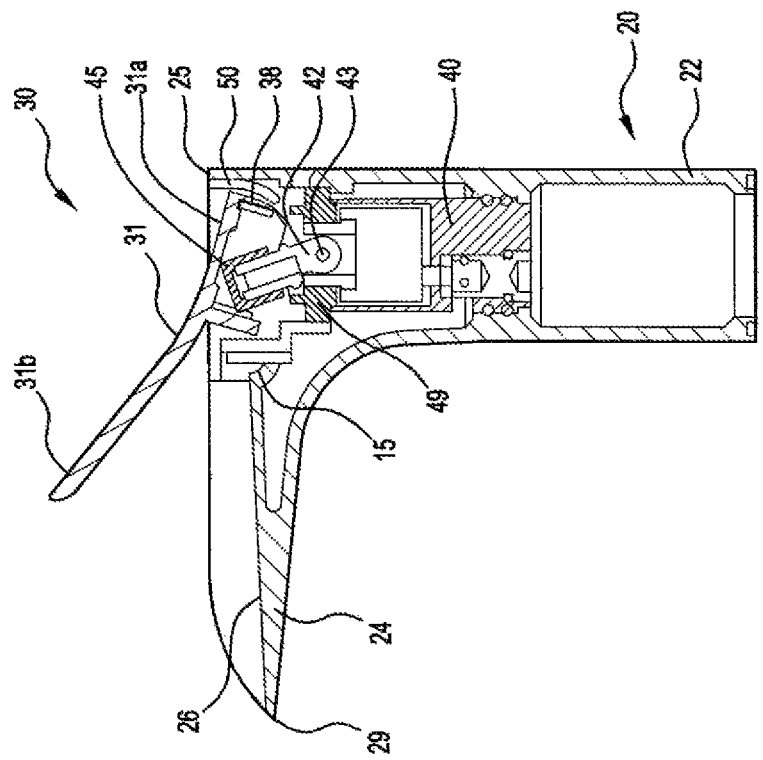
FIG. 4 is a vertical axial cross-section of the basin mixer, with the lever handle in its central off position.

The illustrated basin mixer 10, as seen its normal in situ orientation (FIGS. 1-3), includes a mixer body 20 configured to define a hollow upright post 22 and, at the top of the post, a laterally protruding arm 24. The upper edge of the mixer body 20 is defined by a rim 25 comprising parallel sides and semi-circular ends about a transversely concave shallow recess or channel 26. The inner end of recess 26 opens into the hollow interior of post 22. The end of rim 25 opposite arm 24 snugly receives one end of a lever handle 30 including a relatively thin blade 31.

From above, blade 31 exhibits parallel sides and semi-circular ends and snugly fits within rim 25 but is shorter than the rim at the outer end of the arm. In fact, as seen in the side view of FIG. 2, when lever handle 30 is in its central lowermost position blade 31 has a horizontal portion 31a atop post 22 and substantially flush with rim 25 and an upwardly turned grip portion 31b that is inclined at an angle between 20 and 25°, for example 22°, to the horizontal so as to leave a comfortable space between its underside and recess 26 in which to place a finger to manipulate the handle.

In operation, lever handle 30 is rotated vertically (i.e. about a transverse horizontal axis) to control the rate of flow of water from a water outlet 15 onto the outer part of recess 26, and left or right from a central position (FIG. 1) to control water temperature by varying the hot/cold water mix. During this motion, the curved end of the lever arm at portion 31a drops into post 22 below rim 25—in sharp contrast to conventional arrangements in which the lever handle sits proud of the mixer body and when rotated upwardly protrudes over the edge of the post 22. The mechanism by which this advance is achieved will now be described in greater detail, with reference to FIGS. 4 to 9.

Figure 5:
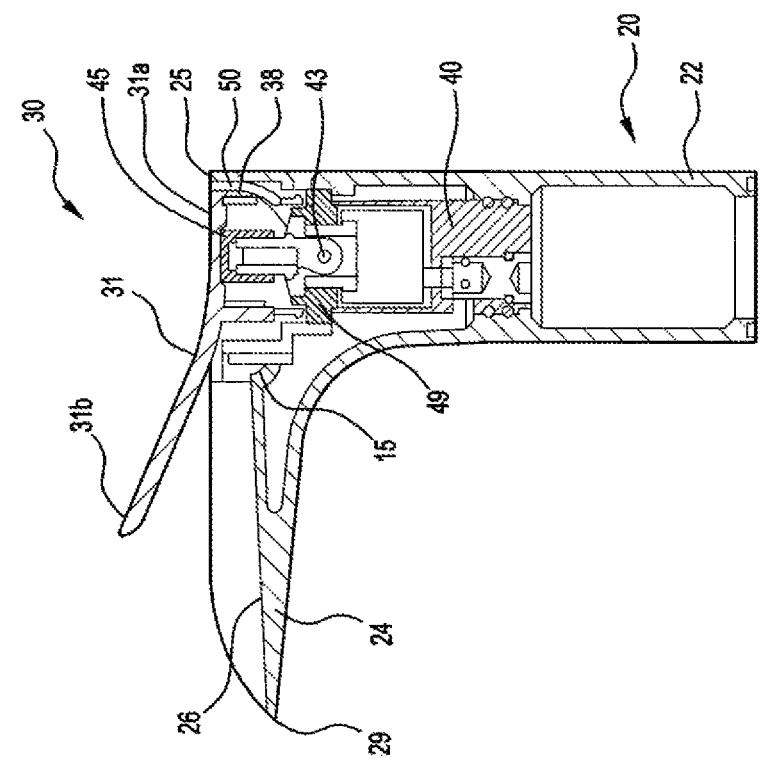
FIG. 5 is a view corresponding to FIG. 4 but with the lever handle in its central on position.
Figure 6:
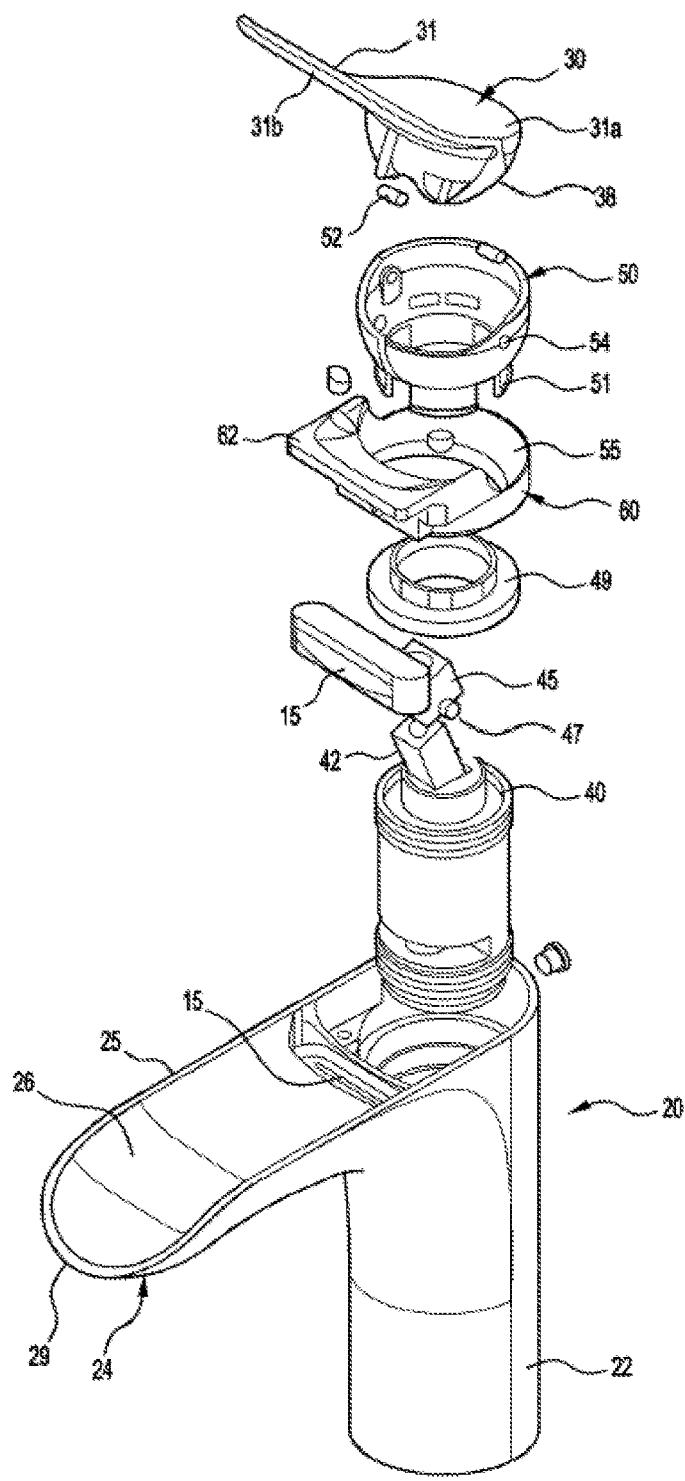
FIG. 6 is an exploded view of the basin mixer assembly.

In the conventional manner, the internal water control element of the mixer is a mixer cartridge 40 mounted within post 22 with an upwardly projecting control element 42 pivoted to the cartridge body at a horizontal axis 43 (FIG. 5). The mixer cartridge is retained in place by a lock nut 49. The rate of flow is adjustable by pivoting control element 42 from a vertically aligned off position to a forwardly inclined fully on position. The proportions of hot and cold water are varied by rotating the control element about the vertical axis of the cartridge and post to vary the proportions of hot and cold water delivered from intake ports in respective pipes to water outlet nozzle 15. Outlet nozzle 15 opens onto the recess 26 so that the water flows along the recess and over its front lip 29. In this manner the recess and its front lip form a single water outlet or spout 18.

Lever handle 30 is pivotally mounted within an annular support in the form of a rotatable bowl-shaped gimbal 50 that accommodates rotation of the handle to left and right and vertically, by means of laterally protruding pins 52 (FIG. 6) on a boss structure 38 of the handle engaging complementary holes 54 on opposite sides of the gimbal. The engagement of pins 52 and holes 54 defines a pair of coaxial first pivots that are fixed against translation. Gimbal 50 rotationally rests on a swivel bearing surface 55. Surface 55 forms part of a fixed partition member 60 that also provides a lever camming function, as will be described later. It is the rotation of the gimbal about the vertical axis of the post that permits the earlier described left and right rotation of the lever handle: depending snaps 51 on the gimbal interact with corresponding stops to define the limits of rotation.

Figure 7:
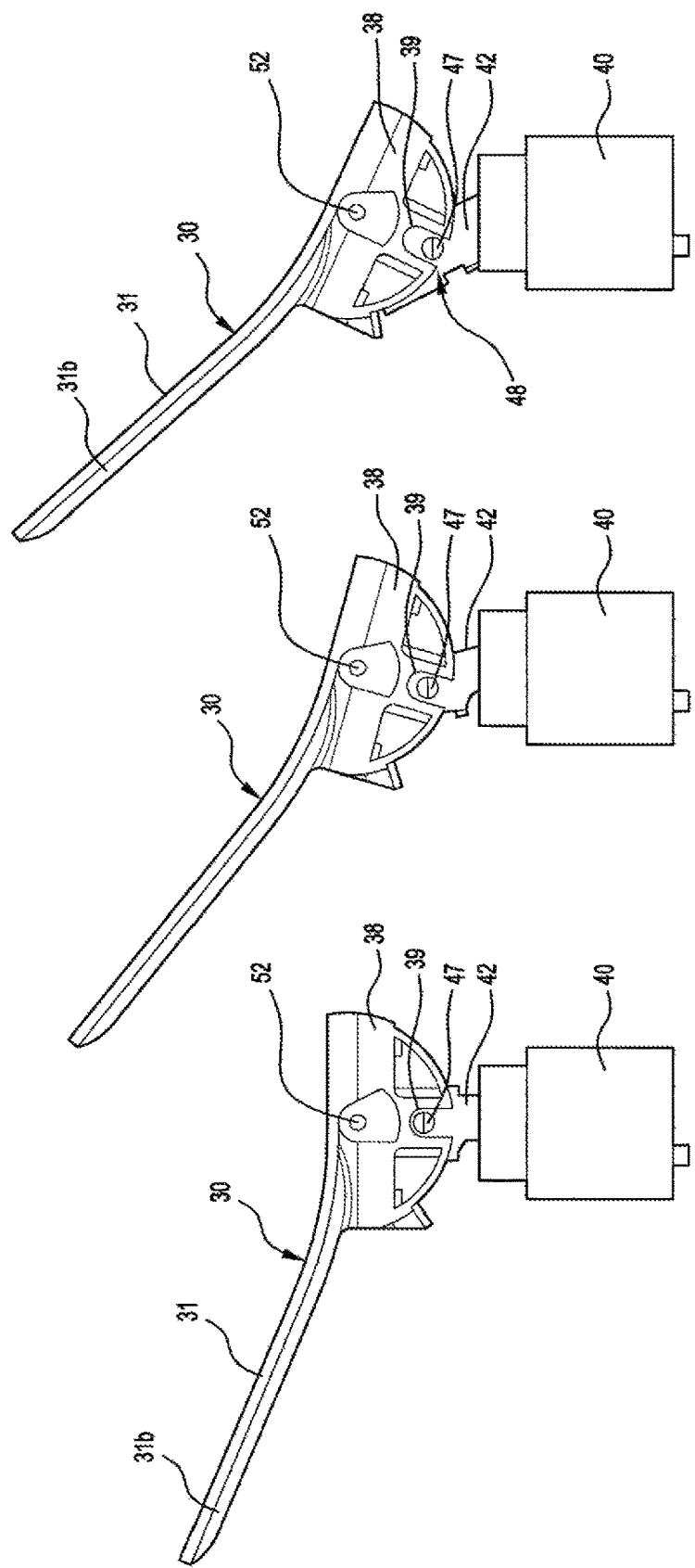
FIG. 7 is a sequence of fragmentary side views showing the manner in which the lever handle is operably coupled to the control element of the mixer cartridge.

Cartridge control element 42 has an end cap 45 with integral oppositely laterally protruding pins 47 that engage the opposed slots 39 (FIG. 7) within boss structure 38 of the lever handle. FIG. 7 illustrates how the resultant pair of sliding pivots 48, a "second" pivot with respect to first pivot 52,54, that is slidable with respect to lever handle 30, allows upward rotation of the lever handle 30 about its translationally fixed pivots 52, to effect rotation of the mixer cartridge control element 42. It will be seen that this arrangement permits the handle pivot to be fixed and thereby allows the handle to be mounted at or below the rim of the mixer body rather than sitting above the body and rotating over its front edge, as in a conventional construction. It will of course be understood that pivots 48 can be slidable with respect to the lever handle and/or the control element.

It will be seen that the first, fixed, pivots 52,54 define an axis of handle rotation that is parallel to an axis of rotation of the control element on the mixer cartridge, and both axes intersect a central vertical axis of the post of the mixer body.

Figure 9:
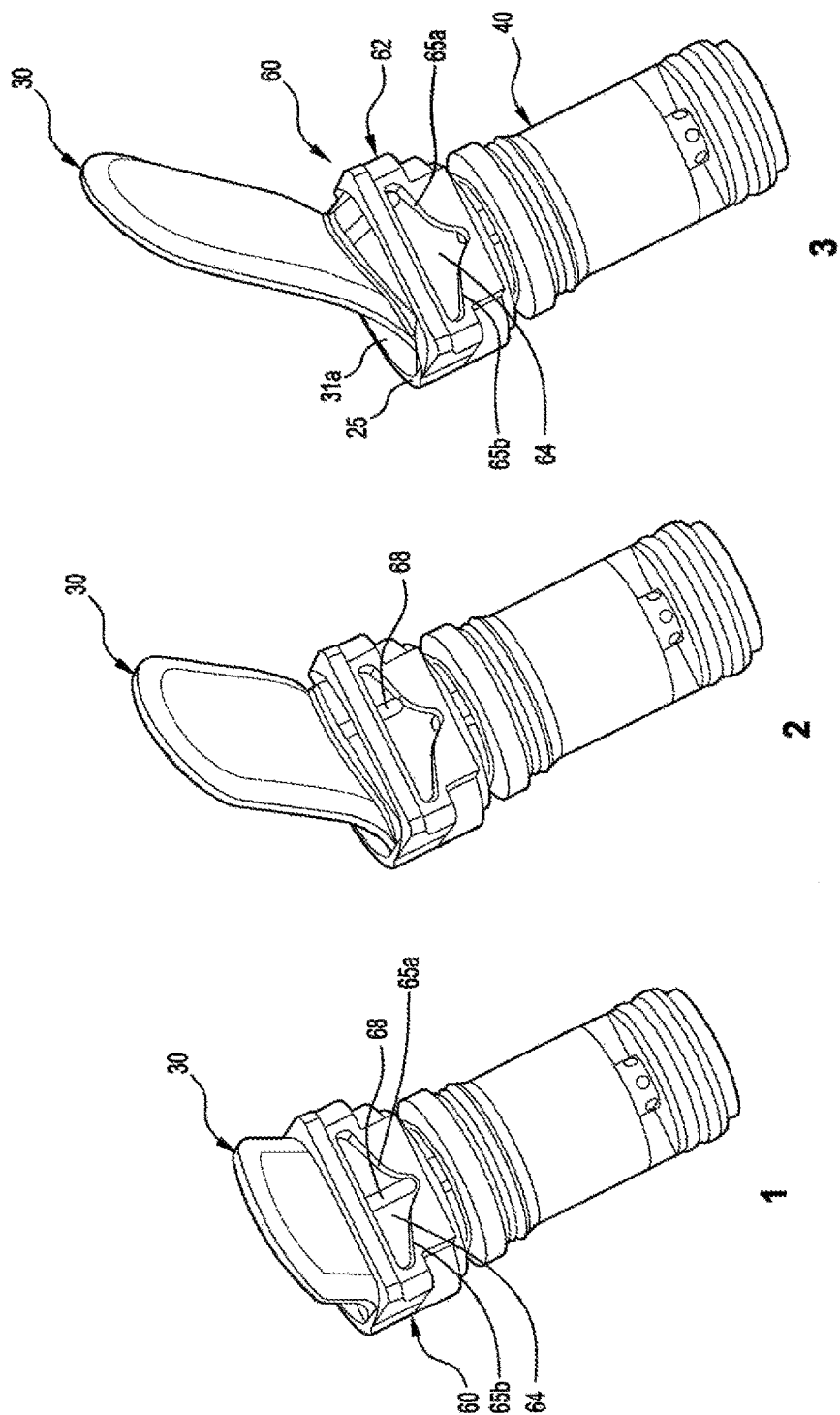
FIG. 9 depicts the cam mechanism by which the lever handle is lifted as it is rotated left or right.

It has already been mentioned that rotation of the lever handle 30 left and right with its mounting gimbal 50 controls the proportional mix of hot and cold water in the usual manner. Partition member 60 has an upstanding land 62 facing arm 24 with a shaped cut-out 64 (FIG. 9). This shaped cut-out in turn defines a pair of cam surfaces 65a, 65b that are engaged by a cam lobe 68 on the underside of the lever handle to guide the lever handle gently and progressively upwardly as it is rotated left or right, whereby the lever handle can clear the straight side segments of rim 25. This movement of course opens the water flow to a certain extent, which can be further increased by using the fingers to further lift the lever handle.

Figure 8:
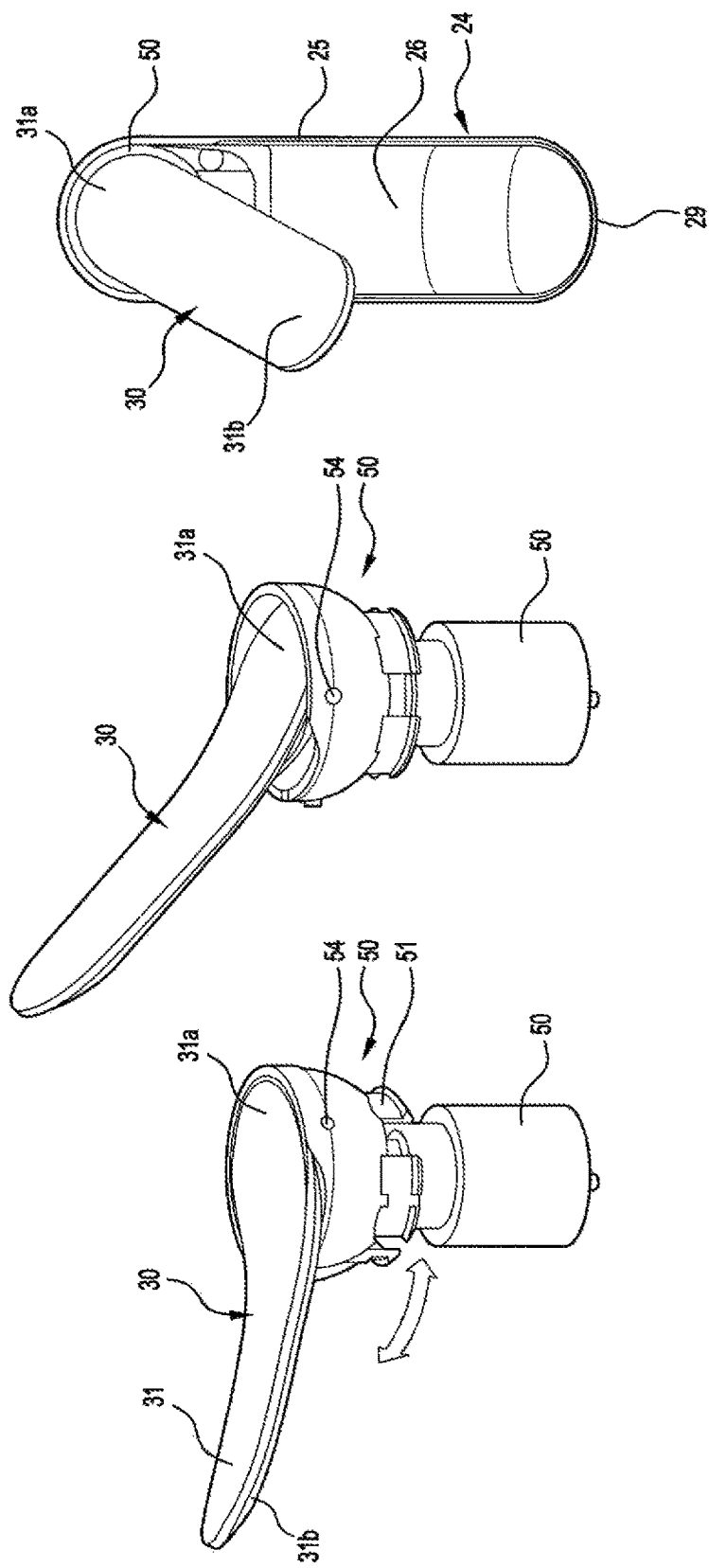
FIG. 8 is a set of views illustrating the operation of the mix control mechanism.

FIG. 8 depicts in side view and plan view one of the extreme positions of the lever handle 30, in which the handle has rotated left 45° and been lifted the full 22° to obtain a full hot water mix. It will be seen that the end 31a of the lever handle 30 opposite the spout or arm 24 has descended below rim 25 and furthermore below the rim of gimbal 50.

Figure 10:
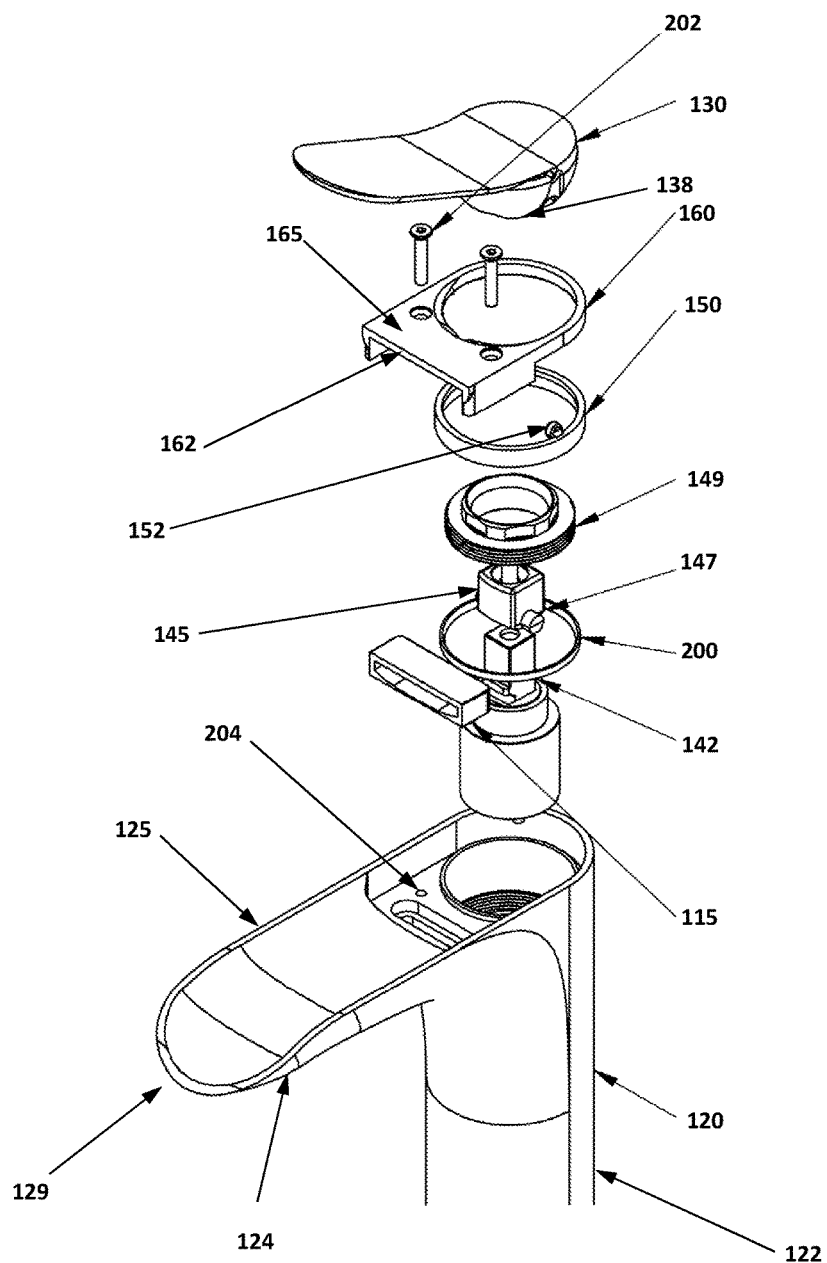
FIG. 10 is a view similar to FIG. 6 of a modified embodiment.

FIG. 10 depicts an alternative embodiment in which like parts are indicated by like reference numerals preceded by a "1". Modifications include replacement of the gimbal 50 by a simple ring 150 that has integral, opposed inwardly projecting pins 152 on which lever handle 130 rotates about a horizontal axis. Ring 150 internally retains a sealing washer 200 to prevent ingress into the mechanism of water carried by a wet hand of a user grasping the lever handle.

Partition member 60 with its ramming action is here provided by a top fixture 160 with a circular opening that receives handle lever boss structure 138. Fixture 160 further has a forwardly projecting ledge 162 with an upper face transversely shaped as a shaped cam surface 165 to engage a cam lobe (not visible) on the underside of the lever handle to guide the lever handle gently and progressively upwardly as it is rotated left or right, whereby the lever handle can clear the straight side segments of rim 125. The subassembly of lever handle 130, fixture 160, ring 150 and sealing, washer 200 is fastened down by screws 202 that engaged threaded holes 204 on mixer body 120.

The invention claimed is:
1. A water mixer comprising:
a water outlet;
a mixer cartridge having a control element; and
a lever handle operably coupled to the control element of the mixer cartridge, the lever handle being mounted for rotation to left and right from a central position;
wherein the lever handle is pivotally mounted to a support for the lever handle at a first pivot that is fixed against translation and to the control element of the mixer cartridge at a second pivot, wherein said first pivot defines a first axis of rotation, and wherein said second pivot is slidable in a slot with respect to the lever handle and/or the control element;

wherein the control element is pivotally mounted to the mixer cartridge so as to rotate about a second axis of rotation, wherein said second axis of rotation is parallel to said first axis of rotation;

wherein rotation of the lever handle in a first direction about said first axis of rotation causes the control element to pivot about said second axis of rotation in a direction opposite the direction in which the lever handle rotates.

2. A water mixer according to claim 1, wherein the support for the lever handle including a boss structure thereof comprises an annular support member that accommodates said rotation to left and right and vertically.

3. A water mixer according to claim 1, wherein the slidable second pivot is provided by laterally protruding pins on the control element.

4. A water mixer according to claim 3, further including a cap having said laterally protruding pins, wherein the cap is located on the control element.

5. A water mixer according to claim 1, further including a body that defines a post and, at an end of the post, a protruding arm that includes said water outlet, and the body further defines a rim about a recess that receives part of the lever handle in a central off position thereof.

6. A water mixer according to claim 5, wherein the fixed first pivot defines an axis of handle rotation that is parallel to an axis of rotation of the control element on the mixer cartridge, and both axes intersect a central axis of the post of the mixer body.

7. A water mixer according to claim 5, wherein the lever handle includes a boss structure and blade that lies atop and projects from the boss structure and at least partially curves upwardly with respect to the mixer body to form a finger graspable part of the handle, and wherein said rim of the mixer body includes parallel sides and a curved portion on the side of the post opposite the protruding arm, the dimensions of the rim and lever handle being such that the recess defined by the rim snugly bounds said blade of the lever handle at the boss structure.

8. A water mixer according to claim 7, further including a cam mechanism by which the lever handle is progressively raised as it is rotated to left or right whereby the handle blade clears said rim of the mixer body.

9. A water mixer according to claim 7, wherein the lever handle is pivotally mounted to the control element at the second slidable pivot such that a horizontal portion of the blade drops into the post below the rim upon upward rotation of the lever handle.

10. A water mixer according to claim 9, further including a cam mechanism by which the lever handle is progressively raised as it is rotated to left or right whereby the handle blade clears said rim of the mixer body.

* * * * *